Figure 1:
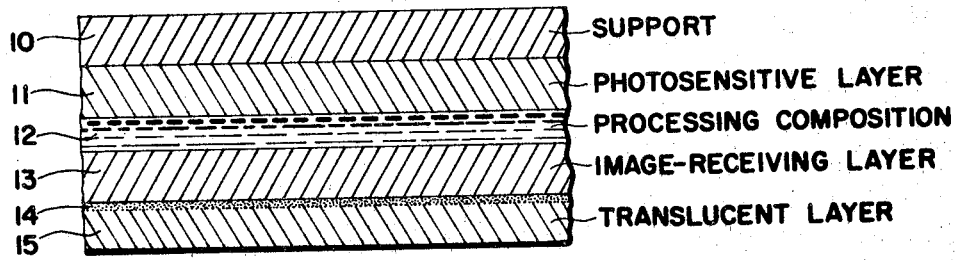

July 2, 1968     R. P. COOK     3,390,991
NOVEL PHOTOGRAPHIC PRODUCTS AND PROCESSES USING A TRANSLUCENT
LAYER OF BIAXIALLY ORIENTED POLYSTYRENE
Filed July 14, 1966

INVENTOR.
Russell P. Cook
BY Brown and Mikulka
ATTORNEYS

United States Patent Office 3,390,991
Patented July 2, 1968

3,390,991
NOVEL PHOTOGRAPHIC PRODUCTS AND PROCESSES USING A TRANSLUCENT LAYER OF BIAXIALLY ORIENTED POLYSTYRENE
Russell P. Cook, Marlboro, Mass., assignor to Polaroid Corporation, Cambridge, Mass., a corporation of Delaware
Filed July 14, 1966, Ser. No. 565,241
9 Claims. (Cl. 96—29)

The present invention relates to photography and, particularly, to a photographic product and process for forming a visible image viewable either as a reflection print or as a transparency and, more particularly, to hereinafter specified translucent sheet material especially adapted for employment to provide such product.

Generally speaking, a photographic image, including a radiograph, traditionally has been classified as comprising either a reflection print or a transparency. A reflection print ordinarily comprises a photographic image associated with a substantially opaque, reflectant backing and is adapted for viewing in accordance with the imagewise control of incident light reflection; whereas a transparency comprises a photographic image ordinarily associated with a substantially transparent backing and adapted to be viewed by the imagewise control of incident light transmission, that is, control of light transmitted through the areas of the print as a function of the photographic image. Each of the foregoing traditionally classified types of photographic images affords specific and unique advantages to the viewer, which are not ordinarily obtainable from the other. For example, in general, a reflection print affords more convenient viewing since it does not require a special source of visible light and/or positioning of the print with respect to the source, as is necessary for the efficient viewing of a transparency. A transparency, however, in general, readily affords greater information detail due, at least in part, to the greater brilliance and longer photographic gradient scale possible when viewing is accomplished employing transmitted visible light. Accordingly, it is of specific advantage to provide an efficient and effective photographic image which can be viewed either as a reflection print or as a transparency so as to combine the advantages of each type of photographic image into a single image.

In U.S. Patent No. 3,163,554, issued Dec. 29, 1964, a film material is described which comprises a transparent sheet material possessing a translucent coating on each of its surfaces and a photographic image associated with one of the translucent coatings. Employing the stated structure, the photographic image may be viewed as a reflection print due to the reflectivity of the translucent coating and, additionally, as a transparency, if the element is suitably positioned with respect to a light source, due to the transmissivity of the translucent coatings.

Specific advantages are to be derived from a photographic image, which is viewable either as a reflection print or a transparency, in the field of radiography since such image will permit a radiologist, for example, to ascertain information characterized by the image as a reflection print, without the necessity of resorting to the special equipment ordinarily required to view a transparency. In addition, the greater detail afforded by a transparency is present for retrieval of more specifically detailed information when desired. In many instances, it has been found that certain information stored as a radiographic image is more readily retrieved upon viewing of a reflection print, whereas other information is more readily retrieved from the same radiograph upon viewing as a transparency.

Accordingly, it is desirable in the field of radiology to provide a photographic product and process which effectively and efficiently provides a radiograph which may be viewed either as a reflection print or as a transparency, hence combining the advantages to be obtained from each in a single radiographic image.

The preparation of a radiograph of the type described above is disclosed and claimed in copending U.S. application Ser. No. 293,326, filed July 8, 1963, now U.S. Patent 3,351,466 in the name of Edwin H. Land. In general, the radiographic product of that application comprises a diffusion transfer process image-receiving layer which possesses, on one surface thereof, an X-ray intensifier screen and a translucent material, and which may optionally possess, on the opposite surface of the image-receiving layer, a photosensitive emulsion.

In products of the above-described type, a translucent material must be provided in layer form associated with the remaining components of the product in order to obtain the results designated. In the prior art, the translucent material generally comprises a coating of a suitable reflective pigment such as finely divided titanium dioxide, calcium carbonate, magnesium oxide, barium sulfate, and the like, distributed in an appropriate polymeric binder such as gelatin and applied to an acceptable support material such as a transparent polymeric film base sheet material. Alternatively, the prior art shows the utilization of translucent sheet materials comprising a suitably pigmented polymeric sheet, or film, to accomplish the desired results. The use of separate coatings, to effect the optical properties desired, provides a concomitant increase in the expense of fabricating such film in terms of, for example, raw material costs, additional production steps and facilities, additional quality control and increased rejection wastes, and the like. The distribution of pigments within a polymeric film or sheet material, employed as the supporting member of a photographic product, deleteriously affects the strength of the polymeric film, in that such film generally possesses a thickness of less than 6 mils, and gives rise to the traditional problem of providing the statistically uniform distribution of pigment necessary to avoid optical defects. In addition, the optical transmission and reflectance qualities of photographic products employing pigmented coatings and/or pigmented polymeric sheet material have been found to be less than that which is to be desired and to accordingly affect the quality of the product.

It is therefore an object of the present invention to provide a photographic element of the type which is particularly adapted to provide, upon exposure of actinic radiation and photographic processing, a visible image viewable either as a reflection print or as a transparency, wherein the translucent material employed comprises a translucent polymeric sheet material which is simple and economical to produce and which material possesses improved light transmissive and reflective qualities.

It is another object of the present invention to provide a diffusion transfer photographic process employing the last-described element.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

In a diffusion transfer process, for the formation of a transfer image, a latent image contained in a selectively photoexposed photosensitive emulsion is developed. Substantially contemporaneous therewith, as a result of development, a soluble imagewise distribution of image-forming components is provided, as a function of the point-to-point degree of emulsion exposure. This imagewise distribution of image-forming components is, at least in part, transported in the direction of a print-receiving element to provide to said element the desired transfer image.

In a diffusion transfer process particularly adapted for the formation of a silver transfer image, a latent image contained in a selectively photoexposed photosensitive silver halide emulsion is developed. Substantially contemporaneous therewith, a soluble silver complex is obtained by reaction of a silver halide solvent with, preferably, the unexposed and undeveloped silver halide of the emulsion. The resultant imagewise distribution of soluble silver complex, for example, a thiosulfate or thiocyanate complex is, at least in part, transported, by imbibition, in the direction of a print-receiving element and the silver thereof is largely precipitated in the silver precipitating layer of said element to provide the desired silver transfer image formation therein.

A high speed silver diffusion transfer process generally comprises a transfer process in which, for example, a silver halide stratum containing a latent image formed at a low exposure level, that is, substantially underexposed in relation to its A.S.A. rating, for example, having an exposure gradient confined to the toe region of the emulsion's characteristic curve such as exposure to incident radiation not substantially exceeding 0.015 mc., and an image-receiving stratum, in superposition, are subjected to a processing composition containing a highly energetic silver halide developing agent and a silver halide solvent in order to form a full-scale silver transfer print in and/or on the image-receiving stratum.

In accordance with the present invention an improved photographic product of the type which provides a visible image, by a diffusion transfer process, viewable either as a reflection print or as a transparency, is provided by utilizing, as the requisite translucent layer, biaxially oriented polystyrene sheet material having at least one surface treated with a solvent for polystyrene. The biaxially oriented polystyrene, when treated with a solvent, becomes highly translucent and exhibits both excellent light transmission and light reflective characteristics, whereby there is provided a photographic product, of the type described above, which exhibits improved image capacity and resolution.

The solvent treatment of biaxially oriented polystyrene to provide the optical characteristics designated can be accomplished in an extremely rapid and economical manner, without the necessity of entertaining the numerous problems and costs required to provide the previously described, less efficient prior art products. In addition, it has been found that image-receiving layers employing conventional polymeric binders such as gelatin can be coated directly on, and are firmly adhered to, the treated surface, of the polystyrene, without the necessity of utilizing a subcoating to effect such adherence, as is traditional in the prior art. Irrespective of the latter described property, however, it has been found that photographic products, fabricated employing the polystyrene, can be stored in such manner that a polymeric coating, for example, gelatin, may be placed in direct contact with a treated surface of the sheet material, for example, during storage in a film pack structure or storage container, without evidence of undesirable adhesion, or blocking, between respective products.

Biaxially oriented polystyrene is a well-known and commercially available material manufactured in accordance with traditional procedures. The polymeric material is basically prepared by casting, or extruding, polymerized styrene, that is, polystyrene, as a sheet and biaxially stretching the sheet, in a heated condition, whereby to orient the polymer chains within the sheet material. The polymer chains, oriented in a substantially parallel relationship by the stretching, are "frozen," while still under tension, by cooling the sheet to below the first order transition temperature of polystyrene. The polymeric sheet material is transparent and possesses a strength exceeding that of nonoriented polystyrene sheet material. The term polystyrene is intended to include the polymerization product of styrene per se as well as its art-recognized equivalents such as the polymerization product of substituted styrenes, for example, alkyl substituted styrenes including methyl styrene and the like.

To prepare the translucent sheet material of the present invention, at least one surface of the biaxially oriented polystyrene is treated with a conventional solvent for polystyrene. This treatment, that is, contact of the biaxially oriented polystyrene with a conventional solvent, apparently softens the surface of the polystyrene allowing polymer chains at the surface to be released from the bond of their "frozen" state and to become disoriented. This disorientation provides a surface to the polystyrene sheet material which is translucent and is further characterized as possessing advantageous visible light transmission and reflection qualitiies. As will become more apparent hereinafter, such treatment also provides a polymeric film surface which accounts for the antiblocking and coating adhesion properties which have been found to be exhibited by the treated sheet material.

The solvents which can be used to effect treatment of the biaxially oriented polystyrene's surface comprise commercially available active solvents, or swelling agents, for polystyrene. Such materials include toluol, n-heptane, methylene dichloride, ethylene dichloride, ketones such as, actone, and the like. Acetone has been specifically found to comprise a preferred solvent, in that it exhibits desirable solvent capacity with respect to polystyrene and readily allows for rapid treatment of the sheet material together with rapid drying, or removal, subsequent to sheet treatment. For purposes of economy, acetone can be readily recovered employing commercial recovery systems and, where desired, recycled directly or indirectly, in order to facilitate production efficiency.

The biaxially oriented polystyrene sheet material, which is selected for treatment, should be constituted of sufficient thickness to allow for solvent surface treatment without deleterious effects upon the dimensional stability of the film. In general, biaxially oriented polystyrene film for use in the present invention preferably will possess a film gauge, or thickness, of from about 1 to 10 mils, more preferably, of from about 3 to 6 mils. Where desired, however, the biaxially oriented polystyrene film may be laminated to a support material where an extremely thin polystyrene film is desired and a solvent treatment, sufficient to provide the desired translucency, might deleteriously affect the dimensional stability of the polystyrene film.

A surface treatment of the biaxially oriented polystyrene film, sufficient to provide the optical translucency properties desired for utilization, in general, causes the film to expand approximately 1.5 to 4 mils in overall thickness of the film per side treated, depending upon the duration of the treatment and the rate of solvent action. In the preferred embodiment, the duration of the surface treatment will be sufficient to cause an expansion of about 2 mils per side of treated film. Thus, since the preferred untreated film possesses a gauge of from about 1 to 10 mils, more preferably, from about 3 to 5 mils, the surface treatment will provide a film of from about 2.5 to 14 mils, more preferably from about 4.5 to 9 mils, assuming treatment of only one surface. Most preferably, after treatment of one surface, the film thickness will comprise about 4.5 to 7 mils. The aforementioned dimensions are for a single surface treatment and ranges for treatment of both surfaces will accordingly comprise about 4 to 18 and 7 to 9 mils, respectively.

Figure 2:
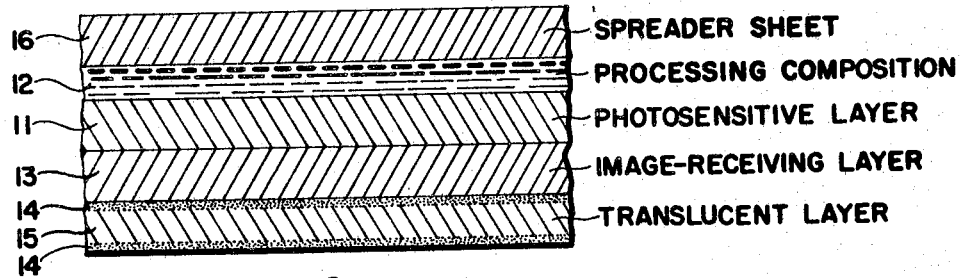

For a fuller understanding of the nature and objects of the invention, reference should be had to the following detailed description taken in connection with the accompanying drawing wherein:

FIGURE 1 is a diagrammatic enlarged cross-sectional view illustrating the association of elements during one stage of the performance of a diffusion transfer process, for the production of a silver transfer image, employing an image-receiving element fabricated in accordance with the present invention and wherein the thickness of the various materials has been exaggerated; and FIG. 2 is a view similar to that of FIGURE 1 illustrating the association of elements during one stage of the performance of another diffusion transfer process, for the production of a silver transfer image, employing a second image-receiving element fabricated in accordance with the present invention and having, contiguous to the image-receiving staratum, a photosensitive silver halide emulsion layer.

Referring to the drawing, FIGURE 1 illustrates one assemblage and process of the present invention in the performance of a diffusion transfer process for the production of a silver transfer print. As depicted in the drawing, an aqueous alkaline fluid layer 12, comprising a silver halide developing agent and a silver halide solvent, is spread between photosensitive silver halide emulsion layer 11, which is affixed support 10, and an image-receiving layer 13, affixed to the surface of polystyrene support layer 15 distal to solvent treated surface 14. Image-receiving layer 13 preferably contains silver precipitating agents or nuclei such as the silver precipitating nuclei disclosed in U.S. Patent No. 2,693,237.

Fluid layer 12 may be obtained by distribution of the processing composition in a substantially uniform manner between photosensitive emulsion layer 11 and image-receiving layer 13, for example, in accordance with the procedures disclosed in U.S. Patent No. 2,543,181. For example, one or more rupturable containers may be attached to either photosensitive emulsion layer 11 and/or image-receiving layer 13 such that upon superposition of the respective layers 11 and 13 said container or containers are so positioned as to be capable, upon rupture, of releasing their contents in a substantially uniform layer between, and in contact with, the opposed surface of each of said layers. Rupture of the container or containers, and spreading of the contents thereof, may be accomplished, for example, by compression between a pair of opposed, suitably gapped rollers.

The processing composition preferably comprises a film-forming transfer processing composition. It may comprise, for example, one or more silver halide developing agents, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing composition prior to the spreading thereof as layer 12, but they may be in part, or in whole, added to the processing composition as it is spread between the photosensitive emulsion 11 and image-receiving layer 13, said agents being so located on, in, or adjacent to a surface of one, or both, of said layers as to be dissolved by, or otherwise interacted with, the liquid agent when the latter wets said layers.

In carrying out the aforementioned transfer process, the photosensitive emulsion 11 is exposed to a predetermined subject matter to form therein a latent image of said subject matter. The exposed emulsion is superposed on image-receiving layer 13 and the photographic processing composition 12 spread between the opposed surfaces of said emulsion 11 and said image-receiving layer 13. Reagents permeate into the photosensitive emulsion 11, developing the latent image contained therein and forming a soluble silver complex of unexposed silver halide. Soluble silver complex is transported from photosensitive emulsion layer 11, at least in part, by imbibition, to print-receiving stratum 13 and the silver of the complex is precipitated thereon and/or therein to provide the desired transfer image formation. The laminate formed by the spreading of the processing composition, as layer 12, between photosensitive emulsion layer 11 and print-receiving layer 13 is kept intact for approximately 10 seconds to 1½ minutes, preferably on the order of 10 seconds, and, at the termination of this time interval, the print-receiving layer 13 is dissociated from photosensitive emulsion 11 as, for example, by manual stripping.

The solvent treated surface 14 not only provides the translucency necessary for the preparation of a transfer image which may be viewed either as a reflection print or as a transparency, but also provides a somewhat roughened surface on which image-receiving layer 15 may be directly coated, as illustrated by FIG. 2, and thus eliminates the general necessity for a subcoat, as has heretofore been traditionally considered necessary for effective adhesion.

A further assemblage of the present invention for the production of positive silver prints is illustrated in FIG. 2 and comprises a spreader sheet 16, a layer of relatively viscous processing composition 12, a photosensitive gelatin emulsion layer 11 superposed on image-receiving layer 13 which is, in turn, mounted on solvent treated surface 14 of polystyrene support layer 15. As stated in connection with the description of FIGURE 1, image-receiving layer 13 preferably contains silver precipitating nuclei and support layer 15 comprises biaxially oriented polystyrene sheet having each surface solvent treated so as to provide surfaces 14.

Fluid composition layer 12 may be obtained by spreading a photographic processing composition, for example, in a manner disclosed in U.S. Patent No. 2,698,244. As disclosed in the aforementioned patent, the liquid processing composition may be disposed in a rupturable container so positioned in regard to the appropriate surface of photosensitive emulsion layer 11 that, upon compression by spreader sheet 16, a substantially uniform layer 12 of processing composition is distributed over the external surface of said photosensitive emulsion 11, that is, the surface opposite image-receiving layer 13.

In carrying out the last-mentioned transfer process, the photosensitive emulsion 11 is exposed to a predetermined subject matter to form therein a latent image of said subject matter. A substantially uniform distribution of processing composition 12 is distributed on the external surface of said emulsion 11, as for example, according to the previously described procedure. Processing composition reagents permeate into photosensitive emulsion 12, developing the latent image contained therein according to the point-to-point degree of exposure thereof. Substantially contemporaneous with the development of the latent image, an imagewise distribution of soluble silver complex is formed within unexposed areas of said emulsion. At least part of said silver complex, solubilized, is transferred, by imbibition, to print-receiving stratum 13. The transferred silver complexes are reacted therein to provide a positive reversed image of the latent image. Subsequent to formation of the positive image in image-receiving layer 13, dissociation of said layer from emulsion layer 11 may be effected.

Where desired, the image-receiving layer 13 may be dissociated from emulsion layer 11 by stripping the emulsion from the surface thereof. A conventional stripping layer may be provided to facilitate separation of emulsion layer 11 from image-receiving layer 13, subsequent to transfer processing. Sufficient abrasion-resistant properties may be provided to image-receiving layer 13 as to alleviate any necessity of subsequently overcoating the external surface of said image-receiving layer 13 with a transparent, abrasion-resistant, water-soluble plastic to prevent subsequent laceration and resultant degradation of the positive image.

In the last-mentioned process, spreading of the liquid processing composition on the external surface of photosensitive emulsion layer 11 is preferably effected by rupture of a suitably positioned frangible container and distribution of its processing composition contents by means of a converted cellulose acetate spreader sheet, that is, a cellulose acetate sheet the surface of which has been converted to cellulose. When employed, the converted cellulose acetate spreader sheet may exhibit an adhesive capacity for the processing composition and the latter for the photosensitive emulsion in excess of the adhesive capacity exhibited by the emulsion for the print-receiving element. A means is thus provided for facilitating dissociation of the photosensitive emulsion position from contact with the image-receiving element, subsequent to image formation, by dissociating the spreader sheet from its proximate relationship to the external emulsion surface.

It will be apparent that the facility with which the photosensitive emulsion layer is dissociated from contact with the print-receiving layer may be increased by providing a conventional stripping layer interposed between said emulsion and said print-receiving layer. The stripping layer may be coated on the surface of the print-receiving element and a photosensitive emulsion thereafter coated on the external surface of said stripping layer.

While distribution of the processing composition in diffusion transfer processes has been described utilizing a frangible container, it will be apparent that said container merely provides a convenient means of distributing the liquid processing composition to permit the processing to be effected with relation to a suitable camera apparatus. The diffusion transfer process of this invention may be otherwise effected. For example, a photosensitive element, after exposure in a suitable apparatus and while preventing further exposure thereafter to actinic radiation, may be removed from such apparatus and permeated with the liquid processing composition as, for example, by coating, spraying, flowing, etc., the composition on said photosensitive element or otherwise wetting said element with a composition, following which the permeated, exposed, photosensitive element, still without additional exposure to actinic radiation, is brought into contact with the image-receiving element for image formation in the manner heretofore described.

The rupturable containers may be constructed in accordance with the disclosure set forth in U.S. Patent No. 2,634,886. Containers of this type are generally constructed from a blank comprising a flexible, deformable, three-ply sheet material comprising, respectively, an outer layer of kraft paper, a layer of metal foil and an inner layer or liner of a thermoplastic resin. The container blank is folded upon itself such as to provide a fluid-containing cavity and a container exhibiting a sealed passage adjacent to an edge thereof which may be substantially uniformly unsealed throughout a predetermined length of the seal passage, upon application of stress to the container. The passage may be formed by the utilization of differential adhesion.

As previously noted, the print-receiving stratum preferably contains silver precipitating agents, or nuclei, whose presence during the transfer process has a desirable effect on the amount, and character, of the silver precipitated during positive print formation. Examples of such silver precipitating agents are the metallic sulfides and selenides, thiooxalates, and thioacetamides, and colloidal metals disclosed in U.S. Patent No. 2,698,237. It is also desirable, as disclosed in that patent, to provide as the vehicle for the silver precipitating agents, a macroscopically continuous film that consists of submacroscopic agglomerates of minute particles of a suitable water-insoluble, inorganic, preferably siliceous, material such as silica aerogel. The use of such a vehicle for the precipitating agents tends to aggregate the silver that is precipitated into its most effective condition for print formation.

Silver halide solvents suitable for incorporation in the processing composition include conventional fixing agents such as sodium thiosulfate, sodium thiocyanate, ammonium thiosulfate, or associations of cyclic imides and nitrogenous bases such as associations of barbiturates or uracils and ammonia or amines. Of these, the conventional fixing agents specified are preferred. Preferably, the solution also contains a film-forming material such as a water-soluble plastic, starch or gum imparting a viscosity of from 1000 to 200,000 centipoise at a temperature of 20° C., in order to permit the solution to be readily controlled during and after spreading.

Silver halide developing agents suitable for incorporation in the processing composition include the conventional developing agents. In particular, the preferred developing agents will comprise an organic compound and, in particular, an organic compound of the aromatic series containing at least two hydroxyl and/or amino groups, wherein at least one of the groups is in one of ortho and para positions with respect to at least one other of the groups, such as, for example, the various known hydroquinones, para-aminophenols, and their various known functional analogues, as detailed in Chapter XIV of The Theory of the Photographic Process (revised edition—1954, C. E. K. Mees, The MacMillan Company, New York, N.Y.), and Chapters VI, VII, VIII and IX, of Photographic Chemistry, Volume 1, P. Glafkides, Fountain Press, London, England.

It will be apparent that the relative proportions of the agents of the developer composition may be altered to suit the requirements of the operator. Thus, it is within the scope of this invention to modify the herein described developing compositons by the substitution of preservatives, alkalies, silver halide solvents, etc., other than those specifically mentioned. When desirable, it is also contemplated to include, in the developing composition, components such as restrainers, accelerators, etc. Similarly, the concentration of developing agent may be varied over a wide range and when desirable the developing agent may be disposed in the photosensitive element prior to the exposure of the emulsion. The developing agent may be disposed in a separate permeable layer of the photosensitive element and/or in the photosensitive emulsion.

The emulsion support layer designated in the drawing as 10 may comprise any of the various types of conventional rigid or flexible supports, for example, glass, paper, metal, and polymeric films of both the synthetic types and those derived from naturally occurring products.

The photosensitive emulsion stratum may comprise a commercially available silver halide gelatin emulsion such as "Microfile" "Spectrum Analysis," "Contrast Process," "S XX Aero Recon," "Verichrome," "Royal Pan," "Royal X Pan," "Tri X Pan," "Fine Grain Pan," "High Speed Pan," "Arrow Pan," "Superior 3," "Triple S. Pan," or "Gevapan."

The solvent treated under-surface 14, illustrated in

FIG. 2, not only provides translucency for the product but also provides an antiblocking effect which prevents one product from adhering to another product when the products are stacked in a film pack. In addition, when the transfer image carrier stratum and its contiguous polystyrene support are separated from the remainder of the film unit comprising the product, such separated prints may also be stacked for storage, in view of the antiblocking properties afforded by solvent treated under surface 14. This property is desirable inasmuch as prints such as radiographs relating to a single patient can be stored in the same container without fear of adhesion damage and without the necessity of interposing separator sheets between the prints.

In the product of FIGURE 2, when such product is employed to provide a radiographic image, an optional X-ray intensifier screen may be included in the product. For example, an X-ray intensifier screen may be interposed, for example, between translucent layer 15 and image-receiving layer 13 or, alternatively, between image-receiving layer 13 and photosensitive layer 11. In radiography, such as a screen is particularly desirable in order to provide increased contrast to the transfer image ultimately provided upon processing. Such screen may be one of the conventional X-ray intensifier screens known to the art and may comprise, for example, a layer of barium sulfate/lead sulfate, or finely divided phosphor particles, dispersed in a conventional binder for same, for example, a chlorosulfonated polyethylene prepared in the manner described in U.S. Patent No. 2,887,379.

Employment of the solvent treated biaxially oriented polystyrene translucent material, as the translucent layer of the above-described product, provides increased efficiency in terms of light transmission and light reflectance, which compared with the structures available in the art, as will be readily illustrated by reference to the following comparative data. The optical properties of the instant application's translucent material was tested employing the translucent layer separated from the remainder of the photographic product and compared directly with a translucent layer of the type employed in the products of the prior art. The thus simplified test procedure comprised measuring the light transmission of a 5 mil biaxially oriented polystyrene film, acetone solvent treated on both surfaces, in a MacBeth Quantolog Transmission Densitometer, commercially available from the Macbeth Company, Newburgh, N.Y. The densitometer provided a reading of 0.18 optical density units, in contradistinction to the identical measurement of a 5.5 mil titanium dioxide coated polyethylene terephthalate film which provided a reading of 0.46 optical density units. The lower reading obtained for the polystyrene film shows that it was considerably more light transmissive than the pigment coated polyethylene terephthalate film. The light reflectance qualities of the same two materials were then tested employing a Macbeth Quantalog Reflection Densitometer. The polystyrene film exhibited a reflection reading of 0.14, in comparison with a reading of 0.26 obtained for the pigment coated polyethylene terephthalate film. The low reading obtained for the polystyrene film shows that the polystyrene film, in addition to having a higher transmissivity, also possesses a higher reflectivity. These two factors, that is, both increased light transmission and light reflectance, combine to provide a visible image viewable by either transmitted or reflected light, when employed as detailed above, possessing increased resolution.

Although the present invention has been specifically described and detailed in terms of a diffusion transfer photographic process employing silver as the transfer image-forming component, it will be readily recognized that the invention has equal applicability to diffusion transfer photographic processes employing image-forming components other than silver such as, for example, transfer processes employing, as image-forming components, color couplers, complete dyes, dye developers, and the like. Silver diffusion transfer processes of the type described above are set forth in U.S. Patents Nos. 2,352,014, 2,500,421, 2,543,181, 2,563,342, 2,565,376, 2,584,029, 2,584,030, 2,603,565, 2,616,807, 2,635,048, 2,644,756, 2,647,055, 2,662,822, 2,698,236, 2,698,237, 2,698,238, 2,698,245, 2,702,244, 2,704,721, 2,740,715, 2,759,825, 2,774,667, 2,823,122, 2,923,623, 2,938,792, 2,962,377, 2,984,565, 3,003,875, 3,043,690, 3,087,815, 3,087,816, 3,091,530, 3,108,001, and 3,113,866. Diffusion transfer photographic processes employing image-forming components other than silver, are disclosed in U.S. Patents Nos. 2,559,643, 2,600,996, 2,614,926, 2,647,049, 2,661,293, 2,698,244, 2,698,798, 2,774,668, 2,802,735, 2,855,299, 2,892,710, 2,909,430, 2,968,554, 2,983,605, 2,983,606, 2,992,104, 2,992,105, 2,992,106, 2,997,390, 3,003,872, 3,015,501, 3,019,104, 3,019,124, 3,022,166, 3,022,167, 3,039,869, 3,043,689, 3,043,692, 3,044,873, 3,047,386, 3,065,074, 3,069,262, 3,069,263, 3,069,264, 3,076,808, 3,076,820, 3,077,400 and 3,077,402.

Thus, in accordance with the present invention, the employment of the hereinbefore described solvent treated biaxially oriented polystyrene sheet material, as the translucent layer in the specified photographic product, provides a visible transfer image, viewable either as a reflection print or as a transparency, which is characterized by increased visible light transmission and visible light reflection qualities, in comparison with the products presently set forth in the art. In addition to the thereby improved image resolution, production of photographic products requiring a translucent layer is facilitated by the simple and economical manner in which such layer may be provided according to the instant disclosure.

Since certain changes may be made in the above product and process without departing from the scope of the invention herein involved, it is intended that all matter contained in the above description or shown in the accompanying drawing shall be interpreted as illustrative and not in a limiting sense.

What is claimed is:

1. As a product, a photographic image-receiving element, for use in a diffusion transfer process, said element comprising a plurality of layers, including an image-receiving layer and a translucent layer, said translucent layer comprising a biaxially oriented polystyrene layer contacted with a solvent for said polystyrene for a time sufficient to provide translucency to said layer.

2. A product as defined in claim 1, including an X-ray intensifier screen intermediate said image-receiving layer and said translucent layer.

3. A product as defined in claim 1, wherein said image-receiving layer is intermediate a photosensitive silver halide emulsion layer and said translucent layer.

4. A product as defined in claim 3, including an X-ray intensifier screen intermediate said emulsion layer and said image-receiving layer.

5. A product as defined in claim 1, wherein both surfaces of said polystyrene layer have been contacted with said solvent.

6. A product as defined in claim 1, wherein said solvent comprises acetone.

7. A product as defined in claim 1, wherein said image-receiving layer contains silver precipitating nuclei.

8. In a diffusion transfer process of the steps which comprise, in combination, exposing a photosensitive silver halide emulsion; developing said exposed silver halide emulsion with a diffusion transfer processing composition; providing thereby an imagewise distribution of image-forming components, as a function of development; and transferring, by imbibition, at least a portion of said imagewise distribution to a superposed image-receiving element to provide thereto a transfer image, said image-receiving element comprising a plurality of layers including an image-receiving layer and a translucent layer, said translucent layer comprising a biaxially oriented polystyrene layer contacted with a solvent for said polystyrene for a time sufficient to make said layer translucent.

9. A diffusion transfer process as defined in claim 8, wherein said diffusion transfer process comprises in combination, the steps of developing said exposed silver halide emulsion by contact of said emulsion with an aqueous alkaline processing composition which includes a silver halide developing agent and a silver halide solvent; contacting unexposed and undeveloped silver halide in said emulsion with said silver halide solvent; forming thereby an imagewise distribution of soluble silver complex in unexposed areas of said emulsion, as a function of the point-to-point degree of emulsion exposure; and transferring from said emulsion, at least in part, by imbibition, said imagewise distribution of soluble silver complex to an image-receiving element comprising an image-receiving layer containing silver precipitation nuclei, in superposed relationship with said emulsion, and a translucent layer, said translucent layer comprising a biaxially oriented polystyrene layer contacted with a solvent for said polystyrene for a time sufficient to provide translucency to said layer, to provide to said image-receiving element a silver transfer image.

References Cited

UNITED STATES PATENTS 3,163,554   12/1964   Kessler _____ 96—29 XR

NORMAN G. TORCHIN, *Primary Examiner.*

J. P. BRAMMER, *Assistant Examiner.*